(12) United States Patent
Watanabe

(10) Patent No.: US 8,464,273 B2
(45) Date of Patent: Jun. 11, 2013

(54) INFORMATION PROCESSING APPARATUS, INFORMATION PROCESSING METHOD, AND COMPUTER-READABLE PROGRAM

(75) Inventor: Hidehiko Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 853 days.

(21) Appl. No.: 12/256,757

(22) Filed: Oct. 23, 2008

(65) Prior Publication Data

US 2009/0132745 A1 May 21, 2009

(30) Foreign Application Priority Data

Nov. 19, 2007 (JP) .................................. 2007-299577
Oct. 1, 2008 (JP) .................................. 2008-256852

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ........................................................ 719/313

(58) Field of Classification Search
USPC ........................................................ 719/313
See application file for complete search history.

(56) References Cited

U.S. PATENT DOCUMENTS

| 5,950,012 | A | 9/1999 | Shiell et al. |
| 2002/0112200 | A1 | 8/2002 | Hines |
| 2004/0210720 | A1 | 10/2004 | Wong et al. |
| 2006/0048129 | A1* | 3/2006 | Napier et al. ........... 717/168 |

FOREIGN PATENT DOCUMENTS

| EP | 0 665 496 A1 | 8/1995 |
| JP | 2-207326 | 8/1990 |
| JP | 10-222361 | 8/1998 |
| JP | 11-306006 | 11/1999 |
| JP | 2001-154838 | 6/2001 |
| JP | 2004-139572 | 5/2004 |

OTHER PUBLICATIONS

Japanese Office Action issued Jan. 15, 2013, in Japan Patent Application No. 2008-256852.

* cited by examiner

*Primary Examiner* — Andy Ho
*Assistant Examiner* — Timothy A Mudrick
(74) *Attorney, Agent, or Firm* — Oblon, Spivak, McClelland, Maier & Neustadt, L.L.P.

(57) ABSTRACT

An information processing apparatus improves the efficiency of use of a program capable of dynamically interrupting another program with a process. The program capable of dynamically interrupting another program with a process is received via a network and applied to the other program. A setting is received indicating whether the predetermined program should be applied to the other program when, after the predetermined program is applied, a supply of power to at least a part of the information processing apparatus is terminated and then resumed. Reapplication necessity information indicating the setting is stored in a storage unit. The predetermined program is reapplied to the other program when, after the application of the predetermined program, the supply of power to the at least a portion of the information processing apparatus is terminated and then resumed, based on the reapplication necessity information.

9 Claims, 14 Drawing Sheets

FIG.8

| PERSISTENCE FLAG | PROGRAM NAME |
|---|---|
| 1 | Copy_Log_collect |
| 0 | Scanner_log_collect |
| 1 | System_log_collect |
| 1 | Fax_log_collect |

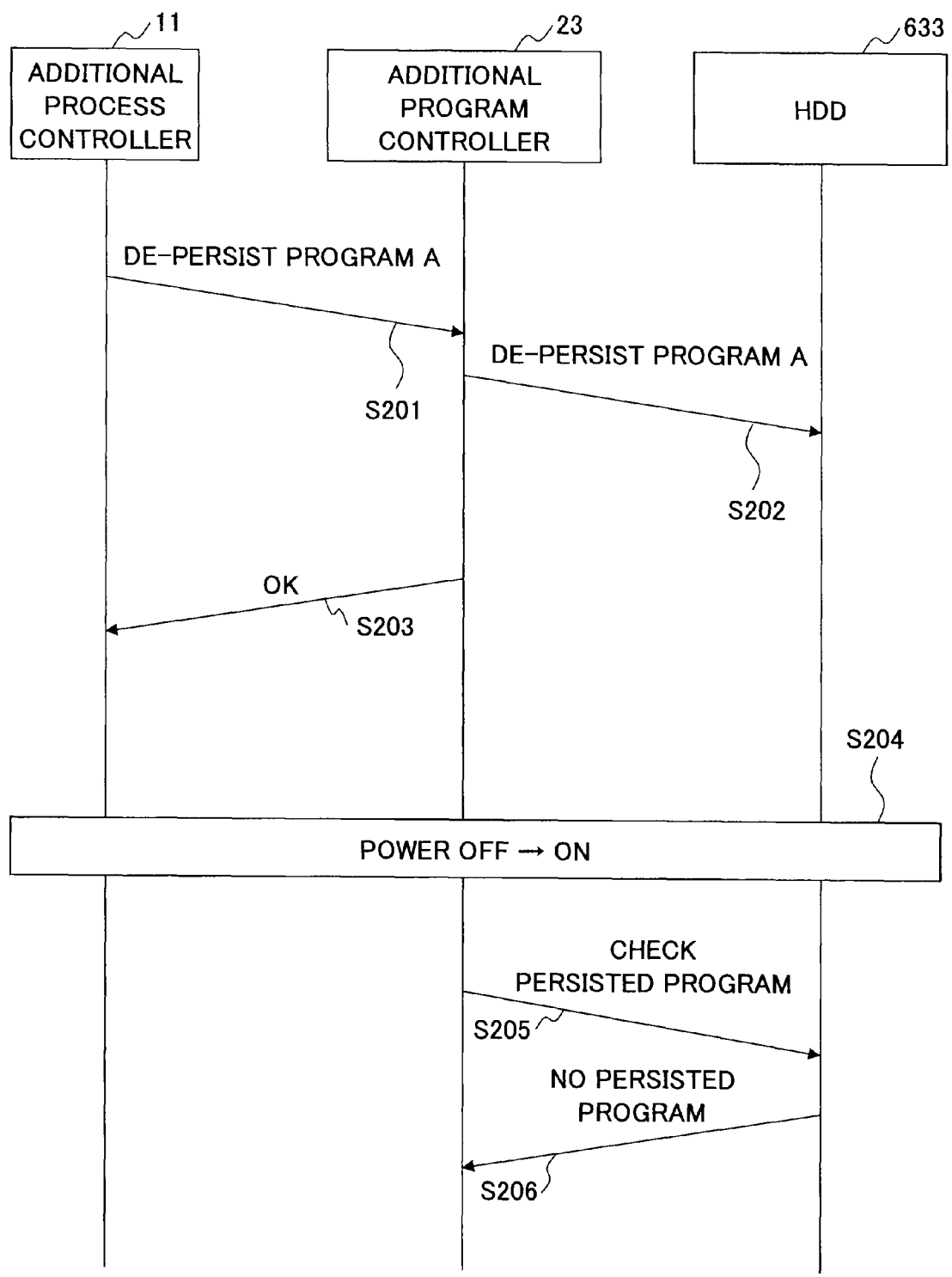

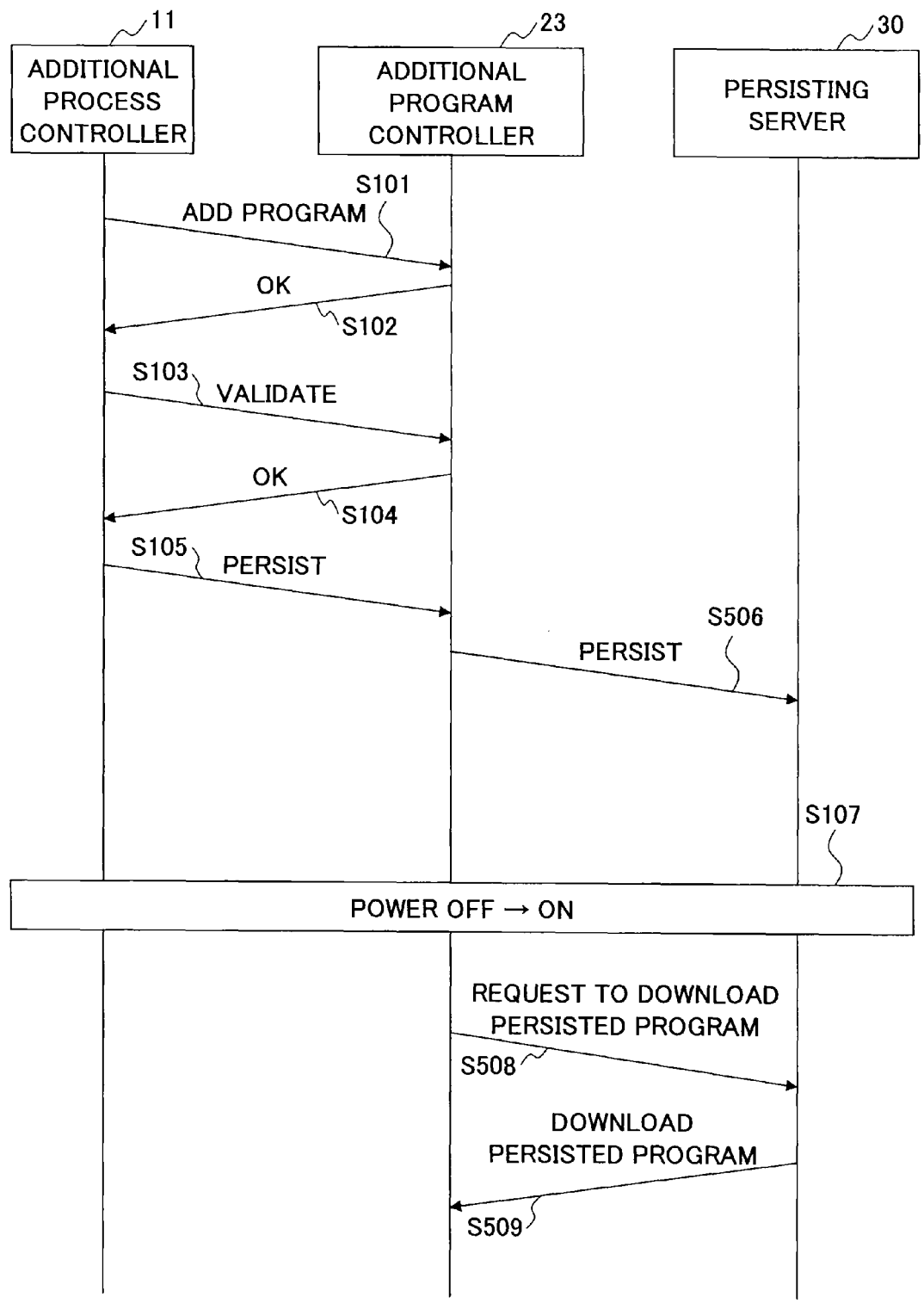

INFORMATION PROCESSING APPARATUS, INFORMATION PROCESSING METHOD, AND COMPUTER-READABLE PROGRAM

BACKGROUND OF THE INVENTION

1. Field of the Invention

The present invention generally relates to information processing apparatuses, methods, and computer-readable programs. More particularly, the invention relates to an information processing apparatus in which power supply to at least a part of the apparatus is terminated after a period of a non-operation status.

2. Description of the Related Art

Conventionally, fault analysis (such as debugging) of a program that runs in an embedded apparatus or the like is typically conducted by analyzing a log outputted by the program. The source code of such a program includes instructions (such as the "printf" function of the computer language C) embedded at certain locations in advance. These instructions are provided for outputting various information, such as the values of variables used by the program or information about the status of hardware on which the program runs, to a log file. In the event of a fault, the log file produced in accordance with such instructions ("log output instructions") is analyzed to infer or identify the cause of the fault.

However, the log file (i.e., the one that is initially outputted) based on the previously embedded log output instruction may prove insufficient for detailed analysis in many cases. In such a case, the site of failure is narrowed to some extent based on the initially outputted log file, and then the source code of the program is modified so as to output a more detailed log concerning areas near the fault, followed by compiling and linking to replace the program. If the cause cannot be identified even with a newly outputted log file, the source code is further embedded with a log output instruction, and the aforementioned process is repeated. Thus, a log-based fault analysis sometimes requires a very complicated operation.

To overcome this problem, Japanese Laid-Open Patent Application No. 2004-139572 discloses a technology whereby a certain location (diagnosed position) of a program as it runs is interrupted dynamically (i.e., during execution of the program) by a process of a diagnosing program. Such a diagnosing program may reference the values of variables of the diagnosed program. At the end of the process of the diagnosing program, process returns to the position where the diagnosed program has been interrupted by the diagnosing program. This technology makes it possible to output a log concerning the diagnosed program without requiring modification of the source code of the diagnosed program.

However, the aforementioned technology requires that the apparatus that is diagnosed by the diagnosing program be connected, via a network, to a computer (hereafter referred to as a "managing server") that manages the diagnosing program, so that the diagnosing program can be sent to the diagnosed apparatus via the network under the control of the managing server.

The diagnosing program transmitted to the apparatus is loaded in a random access memory (RAM) and then executed. This means that the program does not exist when the apparatus is once turned off and then restarted, resulting in the need for the user to perform an operation to once again download the diagnosing program from the managing server and apply it to the diagnosed program.

These days, many apparatuses are equipped with an operation mode called an "energy saving mode". In the energy saving mode, power supply is partially terminated upon continuation of a non-operation status. In some of such systems, the energy saving mode also terminates power supply to RAM. Thus, the probability of loss of a diagnosing program from RAM is higher in systems that have the energy saving mode.

In a known technology, an image in RAM is saved before the termination of supply of power to a computer so that the image can be restored in RAM after reboot. However, this technology merely reproduces in RAM the same state as before the termination of power supply. Thus, such a technology does not involve an automatic process of reapplying the diagnosing program after rebooting the computer and then re-executing the diagnosed program from the beginning.

SUMMARY OF THE INVENTION

It is a general object of the present invention to provide a novel information processing apparatus, method, and a computer-readable program wherein one or more of the aforementioned problems of the related art are eliminated.

A more specific object is to provide an information processing apparatus, method, and a computer-readable program for improving the efficiency of utilization of a program capable of dynamically interrupting another program with a process.

In one aspect, the invention provides an information processing apparatus comprising a receiving unit configured to receive via a network a predetermined program capable of dynamically interrupting another program with a process; an applying unit configured to apply the predetermined program to the other program; a reapplication necessity setting unit configured to receive a reapplication necessity setting indicating whether the predetermined program should be reapplied to the other program when, after the predetermined program is applied to the other program by the applying unit, a supply of power to at least a part of the information processing apparatus is terminated and then resumed, the reapplication necessity setting unit also being configured to record reapplication necessity information corresponding to the reapplication necessity setting in a storage unit; and a reapplying unit configured to reapply the predetermined program to the other program based on the reapplication necessity information when, after the application of the predetermined program to the other program, the supply of power to the at least a portion of the information processing apparatus is terminated and then resumed.

Thus, the efficiency of utilization of a program capable of dynamically interrupting another program with a process can be improved.

In other aspects of the present invention, there may be provided information processing methods and programs whereby the efficiency of utilization of a program capable of dynamically interrupting another program with a process can be improved.

BRIEF DESCRIPTION OF THE DRAWINGS

These and other objects, features and advantages of the invention will be apparent to those skilled in the art from the following detailed description of the invention, when read in conjunction with the accompanying drawings in which:

FIG. 8 shows an example of a managing table;

FIG. 13 shows a sequence diagram of a process of cancelling the persistence of an additional program according to Embodiment 1; and FIG. 14 shows a sequence diagram of an additional program remote load/persisting process according to Embodiment 2.

DETAILED DESCRIPTION OF THE PREFERRED EMBODIMENTS

Embodiments of the present invention are described with reference to the drawings.

Figure 1:
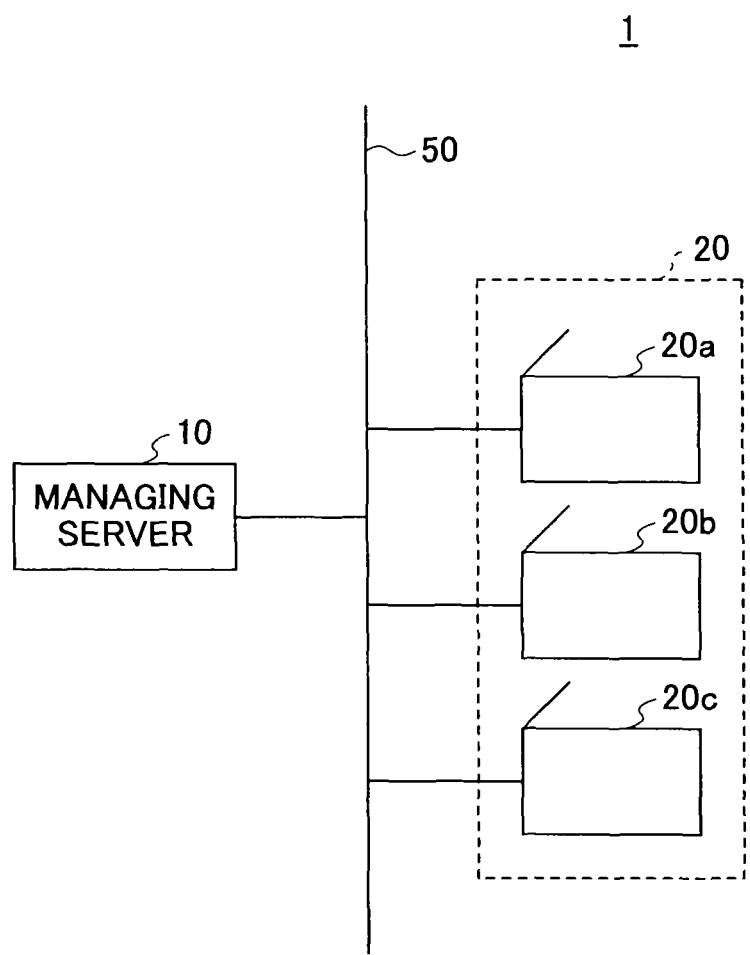
FIG. 1 shows an example of an apparatus managing system according to an embodiment of the present invention.

FIG. 1 shows a structure of an apparatus managing system 1. The apparatus managing system 1 includes a managing server 10 and apparatuses 20a, 20b, and 20c (which may be collectively referred to as an apparatus 20) according to an embodiment of the present invention. The managing server 10 and the apparatus 20 are connected via a network 50 (which may be either wired or wireless), such as a local area network (LAN) in an office.

The apparatus 20 is a multifunction peripheral, which is an image processing apparatus that realizes multiple functions, such as those of a copy machine, a facsimile machine, a printer, and a scanner, within a single enclosure. The apparatus 20 has a central processing unit (CPU) and a memory, and realizes the various functions under the control of the CPU in accordance with a program recorded in the memory.

The managing server 10 is a computer for managing an additional program that is applied to a certain program used in the apparatus 20, or for transferring the additional program to the apparatus 20. In the present embodiment, the term "additional program" is intended to refer to a program capable of dynamically interrupting another program of concern at any desired location therein with a process defined in the additional program.

Figure 2:
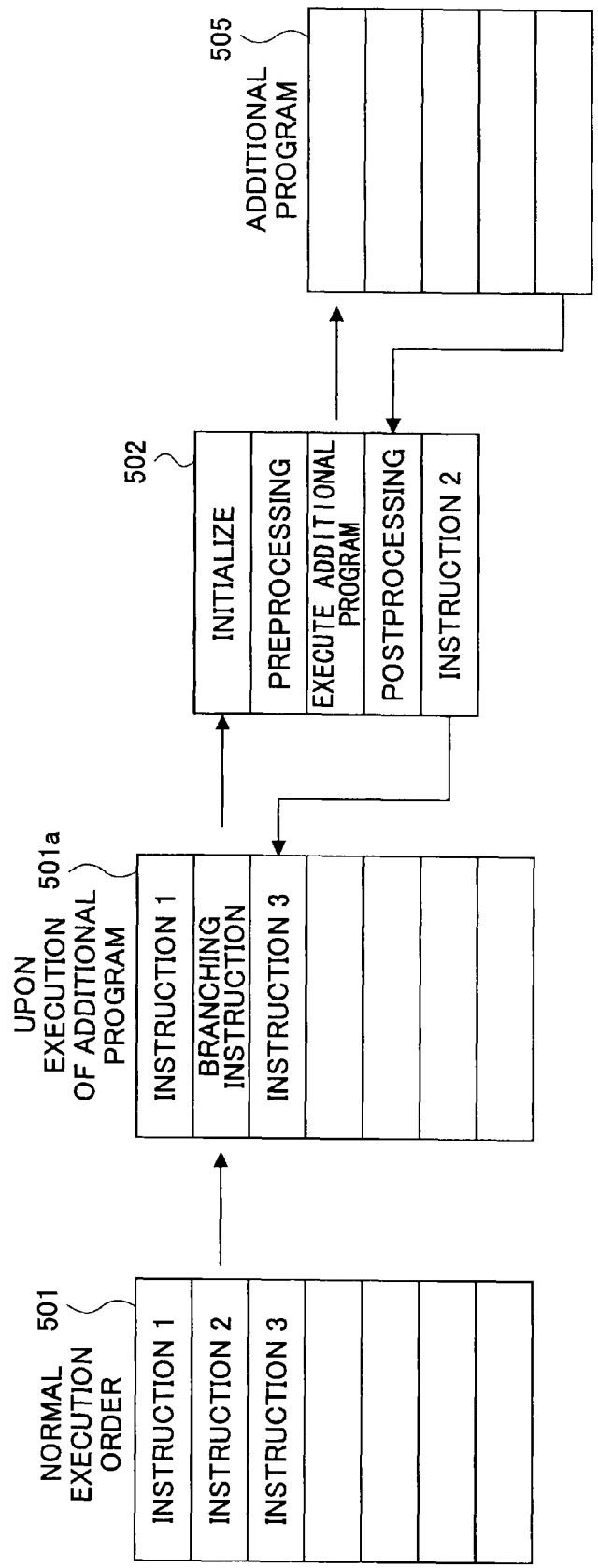
FIG. 2 illustrates how a program is interrupted by an additional program.

With reference to FIG. 2, the additional program is described. Numeral 501 indicates an array of instructions on a virtual memory in the program to which an additional program 505 is applied. Prior to the application of the additional program 505 (i.e., during normal execution), the program 501 executes instructions 1, 2, and 3 in order. Numeral 501a designates a status of the program 501 as the additional program 505 is applied to the program 501. In the present example, the program 501 is interrupted by a process of the additional program 505 between instruction 1 and instruction 2. In this case, instruction 2 is replaced by a branch instruction to a table 502. The table 502 includes definitions for initialization, preprocessing (such as save to a variable stack), a call to the additional program 505, post-processing (such as the taking out of a variable saved in the stack), and instruction 2. Following the execution of instruction 2, the routine returns to instruction 3 in the program 501.

Thus, when the additional program is applied, upon arrival of an execution step of the program of concern (to which the additional program is applied) at a predetermined location ("adding position"), the process of the additional program is executed. After the process of the additional program ends, process control returns to the program of concern. Thereafter, the program of concern resumes process from the adding position. The additional program may include information for identifying the adding position, in addition to the process for interrupting the program of concern.

Within the additional program, a variable of the program of concern may be referenced. Therefore, the use of the additional program makes it possible to perform a process for outputting log information indicating the value of a variable at a certain location in the program of concern, or to interrupt the program of concern with a process for realizing a new function.

By using such additional program, it becomes possible to output log information and enhance functions without requiring modification, compiling, or linking of the source code of the program of concern, and without requiring reinstallation.

Figure 3:
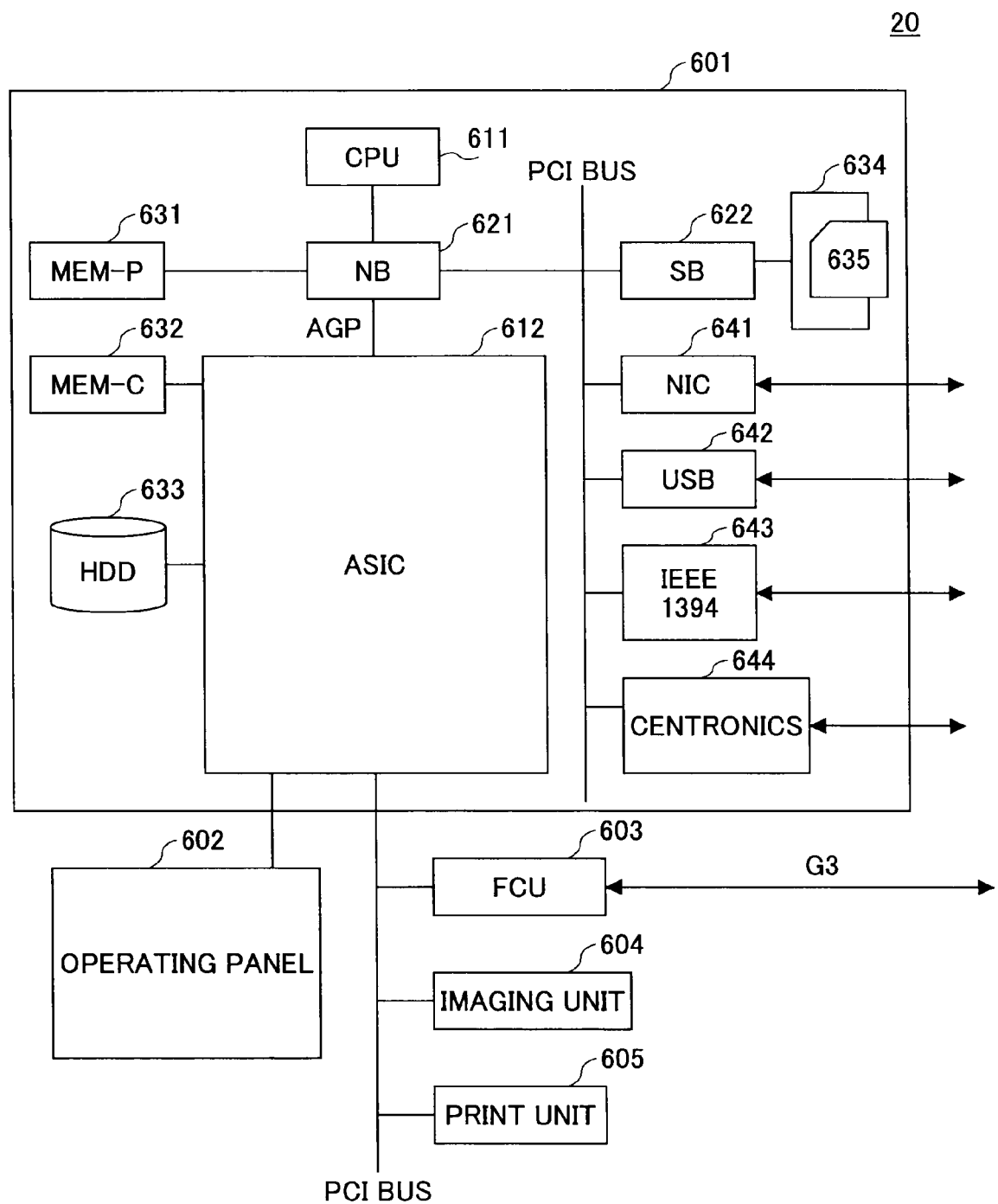
FIG. 3 shows a hardware structure of an apparatus according to an embodiment of the present invention.

FIG. 3 shows a hardware structure of the apparatus 20 according to the embodiment of the present invention. As shown, the apparatus 20 includes a controller 601, an operating panel 602, a facsimile control unit (FCU) 603, an imaging unit 604, and a print unit 605.

The controller 601 includes a CPU 611, an application specific integrated circuit (ASIC) 612, a north bridge (NB) 621, a south bridge (SB) 622, a MEM-P 631, a MEM-C 632, a hard disk drive (HDD) 633, a memory card slot 634, a network interface controller (NIC) 641, a universal serial bus (USB) device 642, an IEEE 1394 device 643, and a Centronics device 644.

The CPU 611 is an IC for processing various information. The ASIC 612 is an IC for various image processing. The MEM-P 631 is a system memory of the apparatus 20. The MEM-C 632 is a local memory of the apparatus 20. The HDD 633 is a storage of the apparatus 20. The memory card slot 634 is a slot for setting the memory card 635. The NIC 641 is a controller for network communications using MAC address. The USB device 642 is a device for providing a USB-standard connection terminal. The IEEE 1394 device 643 is a device for providing an IEEE 1394-standard connection terminal. The Centronics device 644 is a device for providing a Centronics-standard connection terminal. The operating panel 602 is a hardware unit (operating unit) with which an operator can enter data into the apparatus 20, as well as a hardware unit (display unit) with which the operator can gain an output from the apparatus 20.

Figure 4:
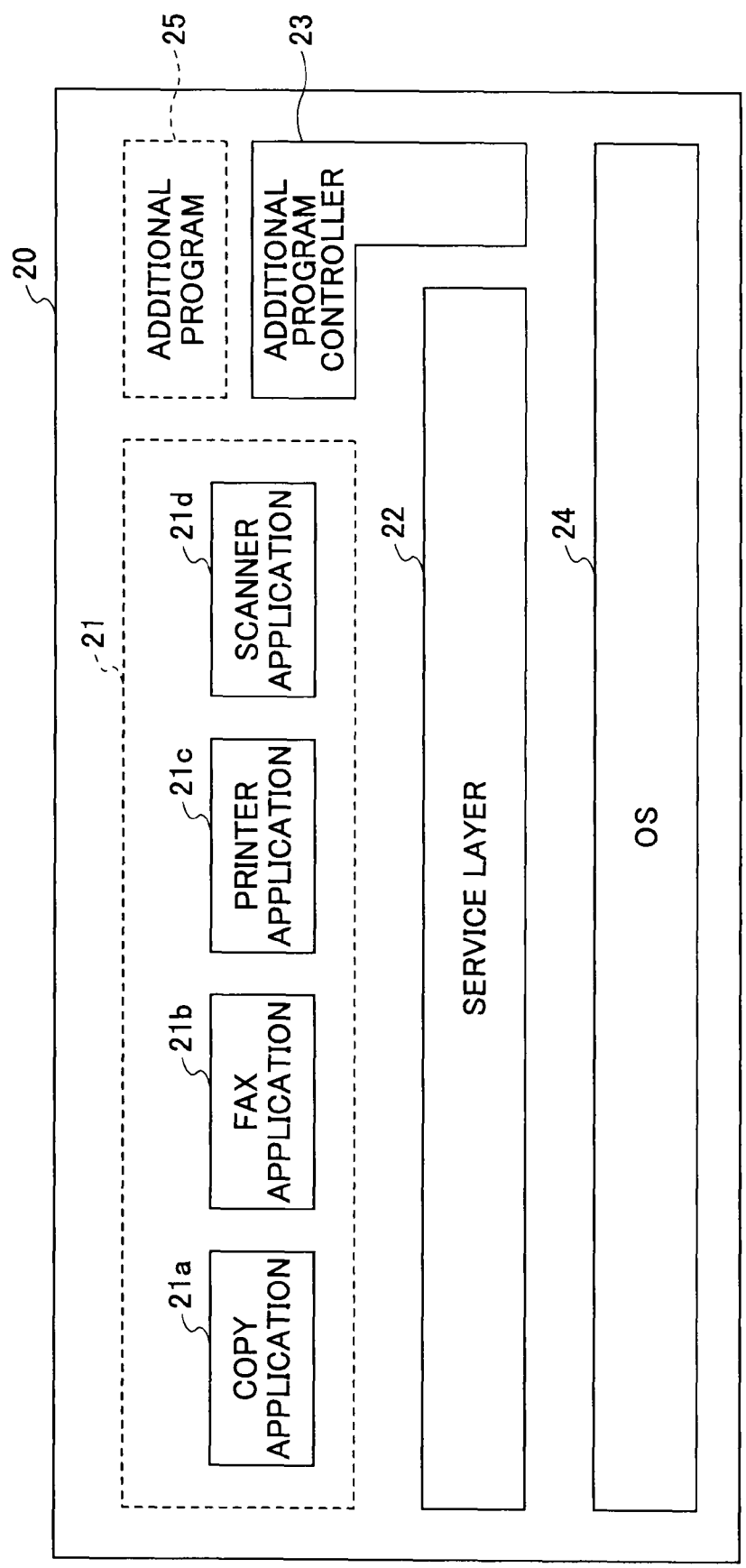
FIG. 4 shows a software structure of the apparatus according to an embodiment.

FIG. 4 shows a software structure of the apparatus according to the present embodiment. In FIG. 4, the apparatus 20 includes a copy application 21a, a FAX application 21b, a printer application 21c, and a scanner application 21d, which may be collectively referred to as an application 21; a service layer 22; a diagnosing program control unit 23; and an operating system (OS) 24. These software units are loaded in a RAM in the MEM-P 631, and a relevant process is executed by the CPU 611 to provide the function of each of the units.

The copy application 21a is an application for realizing the copy function. The FAX application 21b is an application for realizing the FAX function. The printer application 21c is an application for realizing the copy function. The scanner application 21d is an application for realizing the scanner function. In accordance with the present embodiment, the application 21 is the object to which the additional program 25 is applied.

Alternatively, a program in the service layer 22 may be the object to which the additional program 25 is applied.

The service layer 22 consists of a group of programs that provide services (functions) that are commonly required by the application 21. The service layer 22 may include a program for intermediating network communications; a program for controlling hardware units such as the imaging unit 604 and the print unit 605; a program for managing storage units such as a memory or the HDD; and a program for controlling the operating panel 602.

The OS 24 is not limited to any particular type. The additional program control unit 23 is a software unit for realizing an environment for the execution of the additional program 25.

Figure 5:
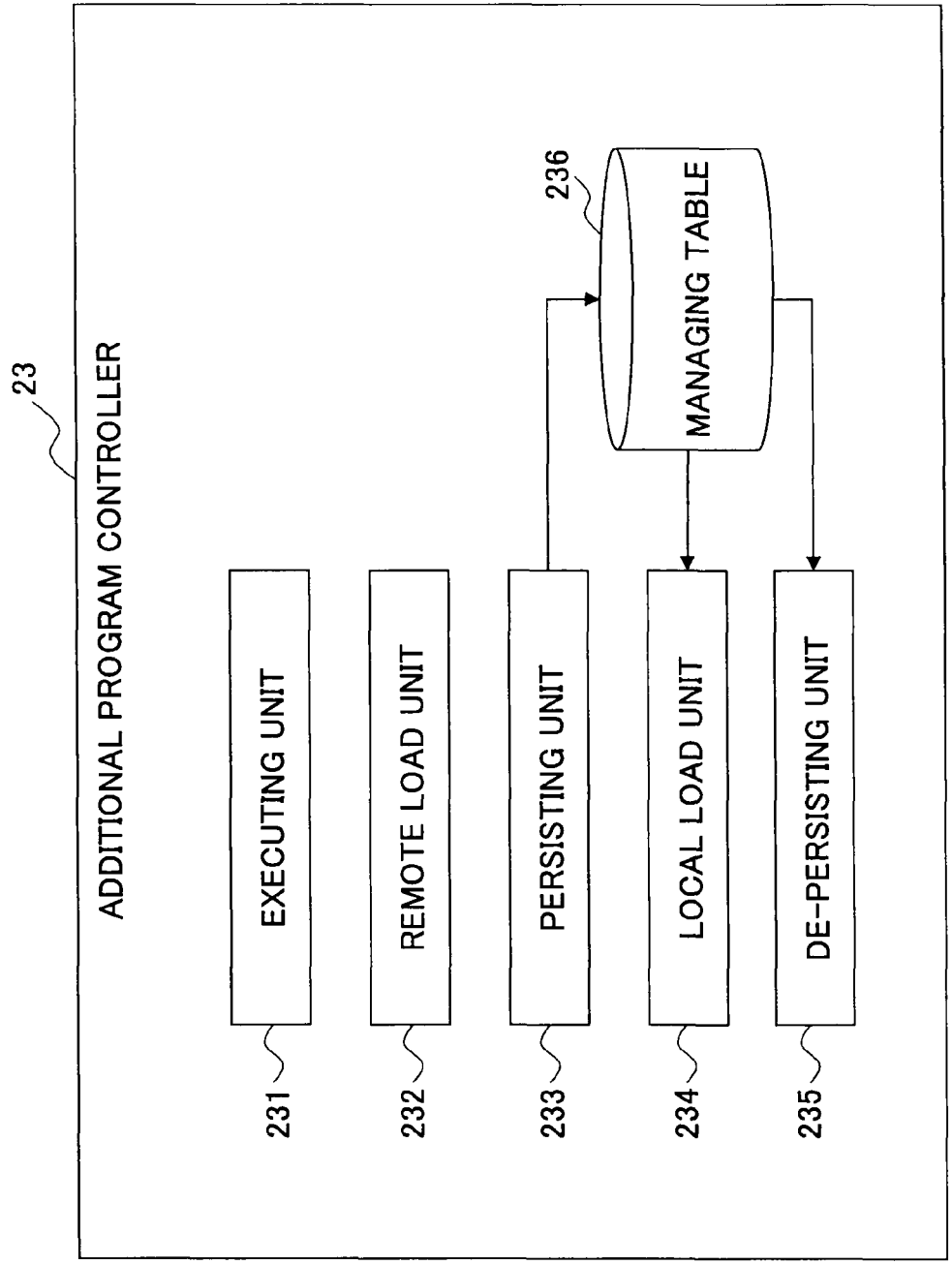
FIG. 5 shows a functional structure of an additional program control unit.

FIG. 5 shows a functional structure of the additional program control unit 23. As shown, the additional program control unit 23 includes an executing unit 231, a remote load unit 232, a persisting unit 233, a local load unit 234, a de-persisting unit 235, and a managing table 236.

The executing unit 231 manages, for each of the applications 21, mapping information (correspondence information) between each step of the source code and memory address information. The executing unit 231 applies the additional program 25 to the application 21 based on the mapping information. More specifically, the executing unit 231 determines the address of the adding position in the application 21 in memory based on the mapping information, and inserts a branching instruction directing to the additional program 25 at the adding position. Upon arriving of an executing step of the application 21 to which the additional program 25 is applied at the addition position, the additional program 25 loaded in RAM in the MEM-P 631 is executed, as described with reference to FIG. 2.

The remote load unit 232 receives (or acquires) the additional program 25 from the managing server 10 via the network, and records (loads) the additional program 25 in RAM, which is a volatile memory.

The persisting unit 233 saves (persists) the additional program 25 acquired by the remote load unit 233 in a nonvolatile memory unit (i.e., the HDD 633). The additional program 25 saved in the HDD 633 is recorded (loaded) in RAM by the local load unit 234.

The de-persisting unit 235 excludes the additional program 25 saved in the HDD 633 as an object of execution (so that the program 25 is not loaded in RAM).

The managing table 236 is a table for managing the persisted additional program 25. The managing table 236 may be recorded in the HDD 633.

Figure 6:
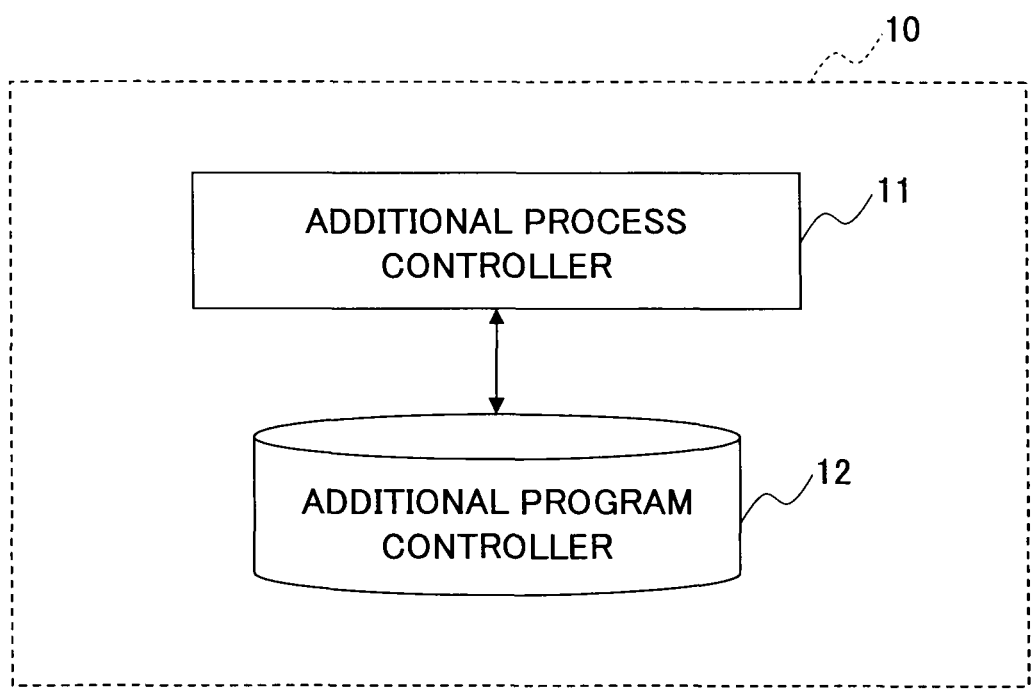
FIG. 6 shows a functional structure of a managing server in an embodiment of the present invention.

FIG. 6 shows a functional structure of the managing server according to the present embodiment. In FIG. 6, the managing server 10 includes an additional processing control unit 11 and an additional program managing unit 12. These units are realized by processes that a program installed in the managing server 10 causes the CPU to execute.

The additional program managing unit 12 manages one or more additional programs stored in a memory unit in the managing server 10. The additional processing control unit 11 may transfer the additional program managed by the managing unit 12 to the apparatus 20.

Embodiment 1

Figure 7:
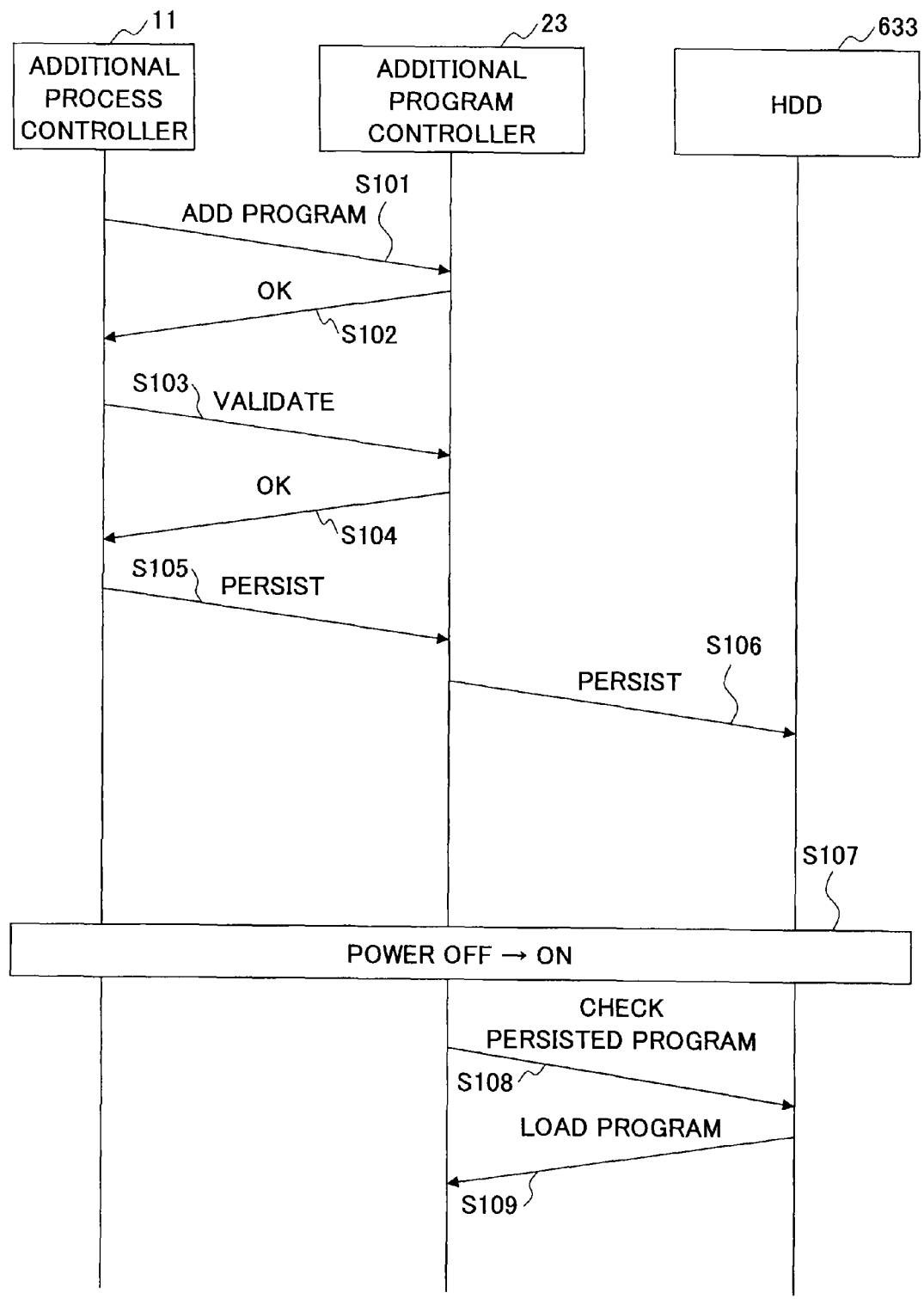
FIG. 7 shows a sequence diagram illustrating an additional program remote loading/persisting process according to Embodiment 1.

FIG. 7 shows a sequence diagram for describing a process for remote loading and persisting of the additional program in the apparatus managing system 1 according to Embodiment 1. It is assumed that at the start of the process, the apparatus 20 is in steady state (where the application 21, for example, can be utilized).

In step S101, the additional processing control unit 11 of the managing server 10 acquires the additional program 25 designated by a user from the additional program managing unit 12, and transmits the additional program 25 to the apparatus 20. The additional program 25 is then received by the remote load unit 232 of the apparatus 20, and recorded in RAM in the MEM-P 631. Upon successful reception of the additional program 25, the remote load unit 232 notifies the additional processing control unit 11 (S102).

Upon reception of a message from the additional processing control unit 11 requesting the enabling of the additional program 25 (S103), the executing unit 231 enables the additional program 25 by confirming the adding position for the additional program 25 and inserting a branch instruction, for example, directing to the additional program 25 at the adding position of the relevant application 21 in RAM. Upon successful enabling, the executing unit 231 notifies the additional processing control unit 11 (S104).

Upon reception of a message from the additional processing control unit 11 instructing that the additional program 25 be persisted (S105), the persisting unit 233 saves (persists) the additional program 25 recorded in RAM in the HDD 633 (S106). At the same time, the persisting unit 233 registers information about the newly persisted additional program 25 in the managing table 236.

FIG. 8 shows an example of the managing table 236. As shown, in the managing table 236, there are registered persistence flags and program names for individual additional programs 25. The program name is used for identifying each additional program 25 in the HDD 633. Therefore, the program name may be a file name.

The persistence flag indicates whether the additional program 25 is persisted as an object of execution. When the flag is "1", the additional program 25 is persisted as an object of execution. When the flag is "0", the additional program 25 is not utilized, or not persisted. The initial value of the flag is "1".

The additional program 25 may be persisted by the persisting unit 233 forcibly upon its reception in step S101. In this case, there is no need for the additional processing control unit 11 to transmit the persisting instruction.

Thereafter, upon arrival of the relevant application 21 at the adding position, the additional program 25 is executed in accordance with the branching instruction inserted at the adding position. As a result, the process implemented in the additional program 25 is inserted in the relevant application 21.

It is now supposed that in the apparatus 20, power supply to at least the RAM has been terminated and then restarted (S107). In this case, the additional program 25 recorded in the volatile RAM is erased. Thus, after the application 21 or the like is started, the local load unit 234 refers to the managing table 236 to determine whether there is an additional program 25 with the persistence flag of "1" (S108). If there is the additional program 25 with the persistence flag of "1", the local load unit 234, based on the corresponding program name recorded in the managing table 236, loads (records) the additional program 25 from the HDD 633 into RAM (S109). Further, the executing unit 231 of the additional program control unit 23 reapplies the additional program 25 to the relevant application 21.

In another embodiment, all of the additional programs 25 stored in the HDD 633 may be considered objects of execution without providing the persistence flag. In this case, the local load unit 234 only needs to check the presence or absence of a file of the additional program 25 in step S108.

Figure 9:
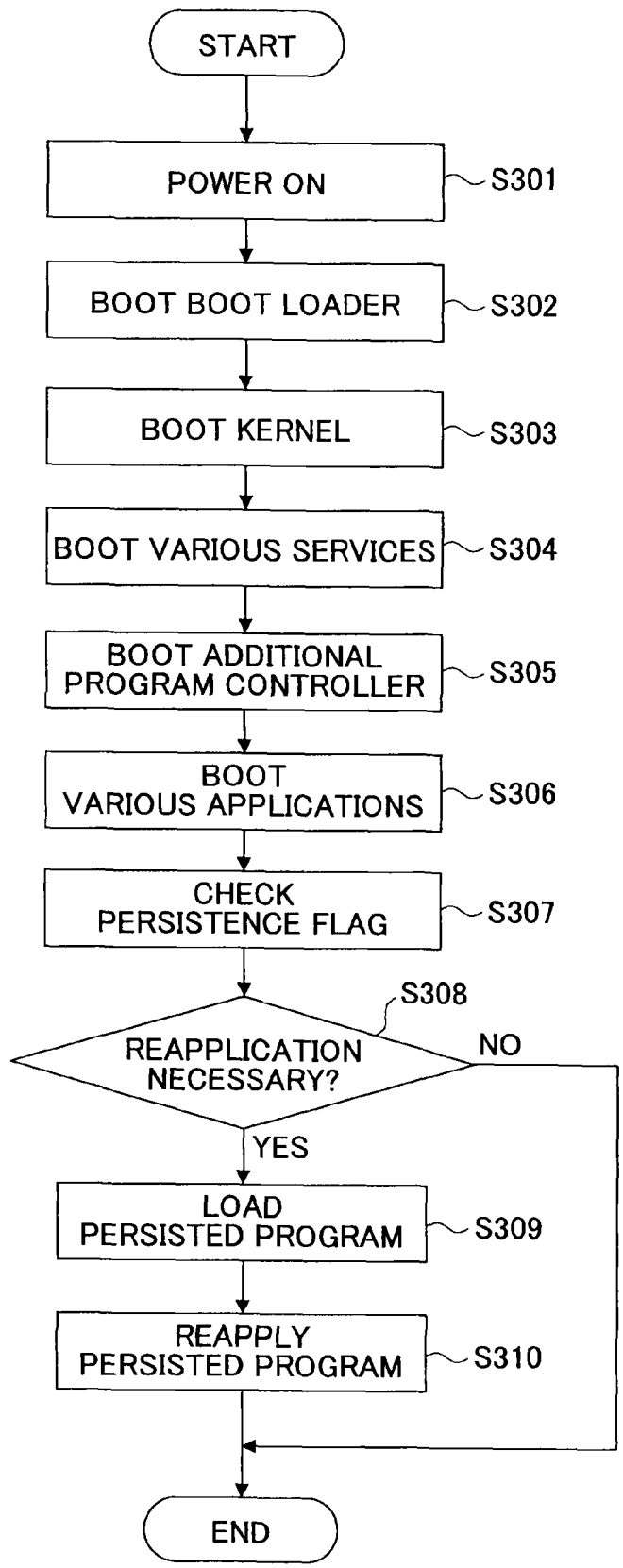
FIG. 9 shows a flowchart of a process sequence performed in an apparatus upon resumption of power supply.

Hereafter a description is given of the process performed in the apparatus 20 upon resumption of power supply in S107 with reference to a flowchart of FIG. 9.

After the apparatus 20 is turned on (S301), the bootstrap loader is booted (S302), and the bootstrap loader boots up the kernel of the OS 24 (S303). The kernel boots up the various programs in the service layer 22, the additional program control unit 23, and the various applications 21 as processes (S304 to S306).

The local load unit 234 of the additional program control unit 23, upon booting, refers to the managing table 236 and checks the values of the persistence flags that are registered (S307). The local load unit 234 then determines the need for reapplication of the additional program 25 based on the value of the persistence flag (S308). Thus, in accordance with the present embodiment, the persistence flag provides information indicating the need for reapplication.

When there is an additional program 25 with the persistence flag "1" (Yes in S308), the local load unit 234 loads the additional program 25 from the HDD 633 to RAM (S309). Thereafter, the executing unit 231 of the additional program control unit 23 reapplies the additional program 25 to the relevant application 21 (S310). More specifically, a branch instruction designating the additional program 25 is inserted at an adding position in the relevant application 21.

Thus, in accordance with the present embodiment, the apparatus 20 can have the additional program 25 stored in the local HDD 633, and the additional program 25 stored in the HDD 633 can be automatically loaded into RAM after rebooting the apparatus 20. Thus, even after power supply is terminated and the additional program 25 in RAM has been erased, there is no need to perform an operation to download the additional program 25 from the managing server 10 again. Furthermore, because the additional program 25 is persisted in the local HDD 633, the additional program 25 can be later utilized in an environment where the managing server 10 is not connected.

Figure 10:
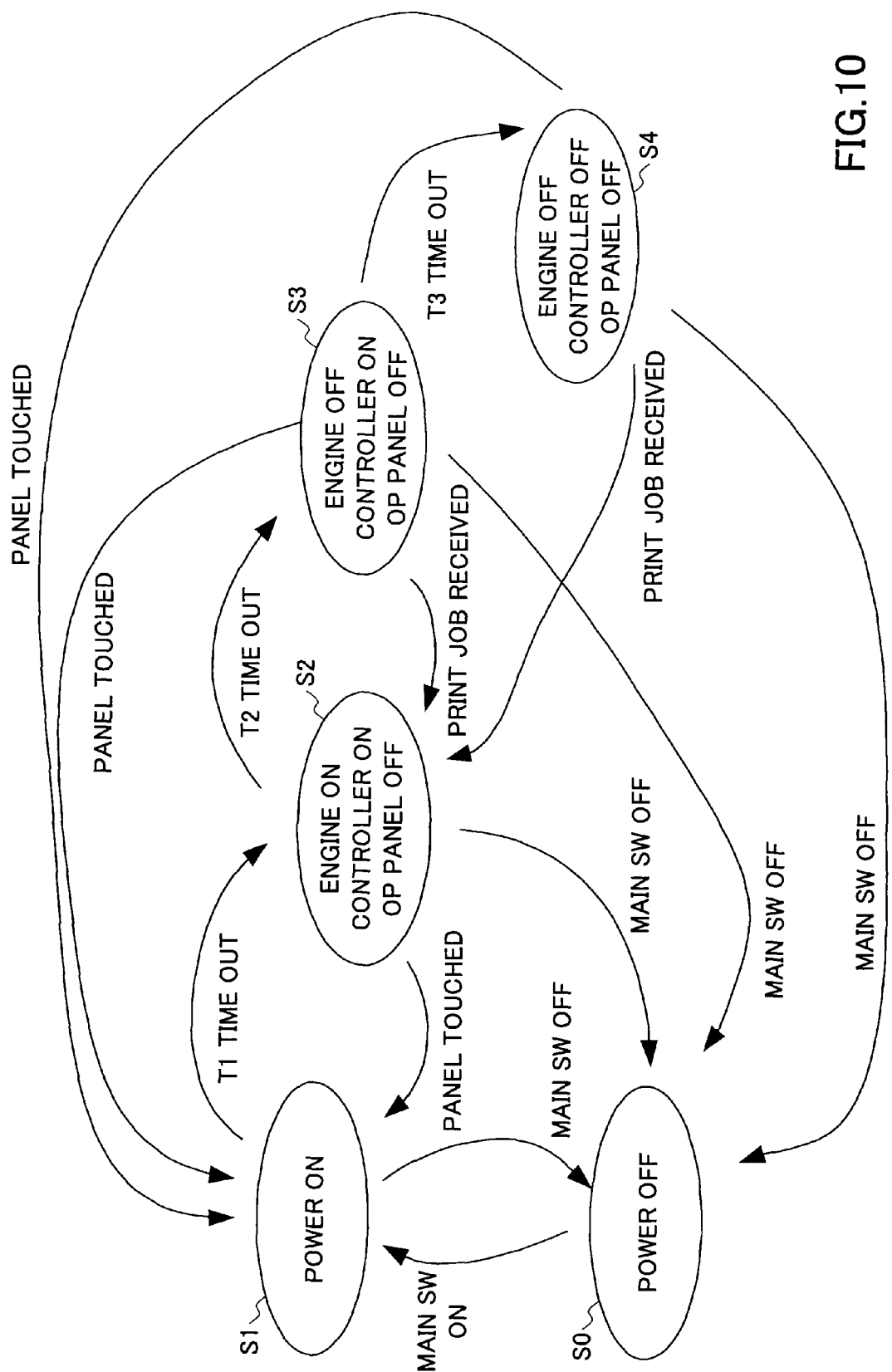
FIG. 10 illustrates the transition of power supply statuses in an apparatus according to Embodiment 1.

The apparatus 20 in accordance with the present embodiment has the operation mode generally referred to as the energy saving mode. Specifically, in this mode, power supply to at least a portion of the apparatus is terminated upon continuation of a non-operation status for a predetermined time. FIG. 10 illustrates the transition of power supply status in the apparatus according to the present embodiment.

In FIG. 10, a power supply OFF status S0 indicates the status in which a main switch is turned off (so that power supply to the apparatus 20 is terminated), where no power is supplied to any of the hardware units shown in FIG. 3. In the power supply OFF status S0, as the main switch is turned ON (i.e., upon resumption of power supply to the apparatus 20), the status transitions to a power supply ON status S1. The power supply ON status S1 is where power is supplied to all of the hardware units shown in FIG. 3 that require power supply. In the power supply ON status S1, after a continuation of a non-operation status for a predetermined period of time, the apparatus 20 transitions to an energy saving level 1 status S2. In the energy saving level 1 status S2, power supply to the operating panel 602 is terminated. However, a print job can be executed in this status. The term "non-operation status" is intended to refer to not only such a status where no human operation involving a user is being conducted, but alto to a status where there is no input of job execution instruction via a network.

When the non-operation status further continues in the energy saving level 1 status S2 for a predetermined time, the apparatus 20 transitions to an energy saving level 2 status S3. In the energy saving level 2 status S3, power supply to the operating panel 602 and the so-called engine units, such as the FCU 603, the imaging unit 604, and the print unit 605, is terminated.

In the energy saving level 2 status S3, if the non-operation status further continues for a predetermined period of time, the apparatus 20 transitions to an energy saving level 3 status S4. In the energy saving level 3 status S4, power supply to the operating panel 602, the engine units, and the controller 601 is terminated.

In the energy saving level 2 status S3 or the energy saving level 3 status S4, upon reception of a print job, the apparatus 20 transitions to the energy saving level 1 status S2. In the energy saving level 1 status S2, the energy saving level 2 status S3, or the energy saving level 3 status S4, when the operating panel 602 is operated, the apparatus 20 transitions to the power supply ON status S1. In any of the statuses, upon turning off of the main switch, the apparatus 20 transitions to the power supply OFF status.

Among the power supply statuses shown in FIG. 10, in the power supply OFF status S0 and the energy saving level 3 status S4, power supply to the MEM-P 631 contained in the controller 601 is terminated. Thus, the termination of power supply to RAM in step S107 in FIG. 7 is based on the aforementioned transition of status. The resumption of power supply to RAM is based on the transition from the power supply OFF status S0 to the power supply ON status S1, or from the energy saving level 3 status S4 to the energy saving level 1 status S2 or the power supply ON status S1.

Namely, the processing in step S108 is also executed upon return from the energy saving mode. Thus, when the frequency of termination of power supply to RAM due to the energy saving mode is relatively high in the apparatus 20, the frequency of download of the additional program 25 via a network can be greatly reduced by utilizing the additional program 25 that is persisted locally, as in the present embodiment.

In the foregoing embodiment, all of the additional programs 25 are automatically considered subject to persisting upon their download. In the following, an example is described in which the need or no-need for persisting can be set. In this case, the additional process control unit 11 of the managing server 10 performs the following process in step S101 regarding the additional program 25 selected by the user.

Figure 11:
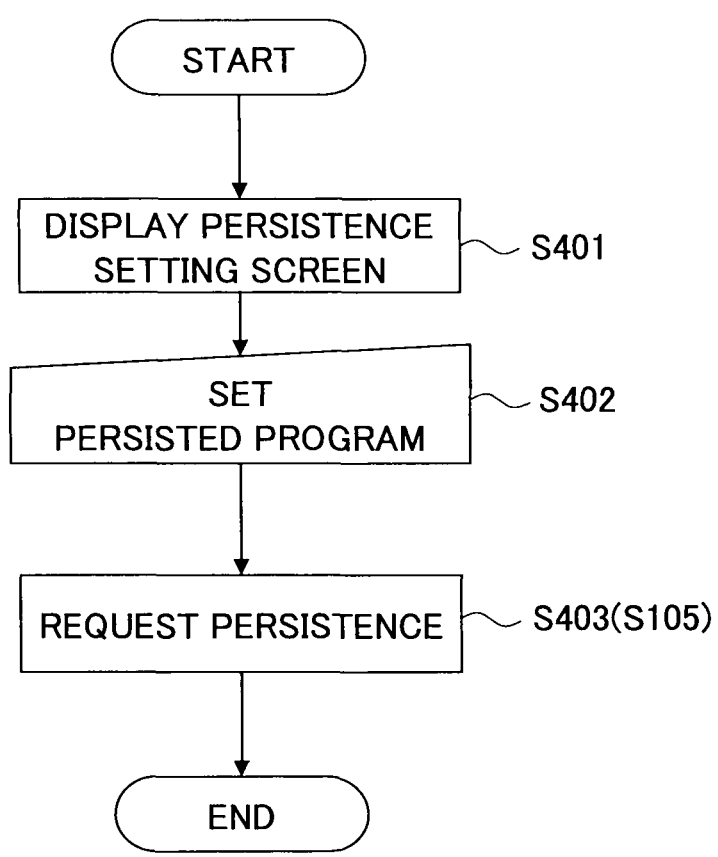
FIG. 11 shows a flowchart of a persistence requirement setting process.

FIG. 11 shows a flowchart of a persistence requirement setting process.

When a user selects the additional program 25, the additional process control unit 11 causes a persistence setting screen to be displayed on a display unit of the managing server 10 (S401).

Figure 12:
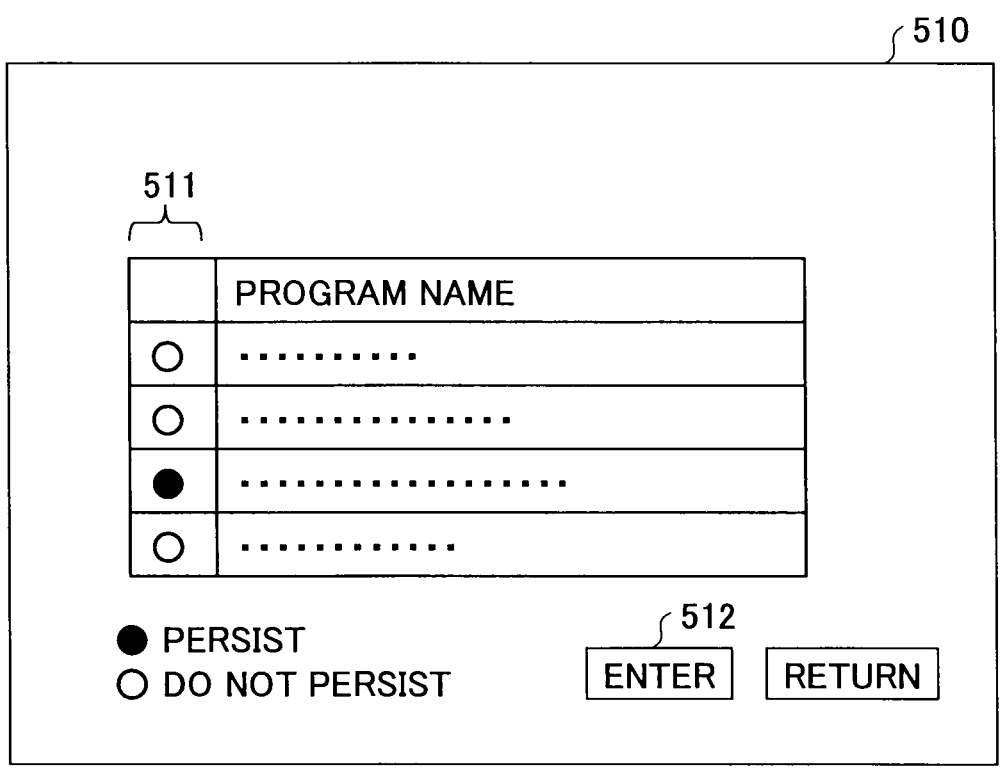
FIG. 12 shows an example of a persistence setting screen.

FIG. 12 shows an example of the persistence setting screen. As shown, the persistence setting screen 510 shows a list of additional programs 25 selected by the user, where check buttons 511 are provided for the individual additional programs 25.

The user then sets the need for persistence on an individual additional program 25 basis. Specifically, the user sets the check button 511 for the additional program 25 that requires persisting in a checked status, while setting the check buttons 511 for those additional programs 25 that do not require persisting in an un-checked status. The setting of the need for persistence indicates whether, after rebooting the apparatus 20, it is necessary to reapply the additional program 25.

When an enter button 512 is pressed (clicked), the additional process control unit 11 starts the process following step S101. When requesting persistence, the additional process control unit 11 transmits to the apparatus 20 a message corresponding to the setting on the persistence setting screen 510 (S403). Namely, when the additional program 25 has its check button 511 checked, the additional process control unit 11 determines that the additional program requires persistence, and requests that the additional program 25 be persisted. Step S403 corresponds to step S105 of FIG. 7.

In the apparatus 20, upon reception of the message from the additional process control unit 11 requesting persisting of the additional program 25, the persisting unit 233 only stores (persists) in the HDD 633 those of the additional programs 25 recorded in RAM of which persistence is requested. At this time, the persisting unit 233 registers the information (persistence flags and program names) about the newly persisted additional programs 25 in the managing table 236.

Thus, by enabling the user to make a setting concerning the need for persistence of the additional program 25, the user can make a choice not to perform persisting. Thus, in accordance with the present embodiment, the additional program 25 can be automatically applied after rebooting the apparatus 20. If the additional program 25 has a bug that has caused a malfunction in the relevant application 21, the apparatus 20 may be turned off and then rebooted, and yet the same malfunction may be repeated upon reapplication of the additional program 25. When such an incident is expected (such as when no tests are performed regarding the operation of the additional program 25), the repetition of the malfunction after rebooting the apparatus 20 can be avoided by not requesting persistence of the additional program 25.

In the following, a description is given of a process of cancelling the persistence of the additional program 25 that has become unwanted. FIG. 13 shows a sequence diagram of the process for cancelling the persistence of the additional program.

In step S101, as the additional processing control unit 11 of the managing server 10 transmits a request for cancelling the persistence of the additional program 25 (additional program A) designated by the user to the apparatus 20 (S201), the de-persisting unit 235 of the apparatus 20 eliminates the persistence of the additional program A (S202). Specifically, the persistence flag for the additional program A in the managing table 236 is changed to "0". Alternatively, the additional program A per se may be deleted from the HDD 633. Upon successful cancellation of persistence, the de-persisting unit 235 notifies the additional processing control unit 11 (S203).

Thereafter, when power supply to at least RAM is once terminated at the end of utilization of the apparatus 20, for example, and then resumed (S204), the local load unit 234 refers to the managing table 236 to determine whether there is the additional program 25 with the persistence flag of "1" (S205). Since the additional program A has had its persistence canceled, the additional program A is not started up (S206).

Thus, the application of the additional program 25 that has become unwanted can be property avoided. The instruction for cancelling persistence may be entered via the operating panel 602. In this case, the managing server 10 and the apparatus 20 may not be connected via a network.

Embodiment 2

In the following, a second embodiment is described. Portions of Embodiment 2 that are not particularly discussed below may be similar to the corresponding portions of Embodiment 1. FIG. 14 shows a sequence diagram with reference to which a remote load and persisting process for an additional program according to Embodiment 2 is described. In FIG. 14, the steps identical to the steps shown in FIG. 7 are designated with the same step numbers and their description is omitted whenever appropriate. In FIG. 14, a persisting server 30 is a computer connected with the apparatus 20 via a network.

Upon reception of a message from the additional process control unit 11 requesting persistence of the additional program 25 (S105), the persisting unit 233 transmits to the persisting server 30 only the additional program 25 requested to be persisted among the additional programs 25 recorded in RAM, requesting that the additional program be persisted (saved) (S506). The persisting server 30 stores the additional program to be persisted in a storage device. Further, the persisting server 30 registers information about the newly persisted additional program 25 in the managing table 236.

Thus, in accordance with Embodiment 2, the persisting server 30 includes the managing table 236. Alternatively, the managing table 236 may be provided in the apparatus 20, as in the case of Embodiment 1. In this case, the persisting unit 233 may register the information about the newly persisted additional program 25 in the managing table 236.

After power supply to at least RAM in the apparatus 20 is terminated, upon resumption of power supply (S107), the local load unit 234 transmits to the persisting server 30 a request to download the persisted additional program 25 (S508). In response, the persisting server 30 transmits the persisted additional program 25 to the additional program control unit 23 (S509). The additional program control unit 23 loads the received additional program 25 in RAM and reapplies the additional program 25 to a relevant application.

As described above, in accordance with Embodiment 2, the additional program 25 can be persisted in an apparatus (persisting server 30) outside the apparatus 20. Thus, the consumption of hardware resources in the apparatus 20 in which the hardware resources are strictly limited can be controlled.

The persisting server 30 may be provided by the managing server 10. In this case, the additional program 25 may not necessarily need to be transmitted in step S506 because the additional program 25 is stored (managed) in the managing server 10. However, the managing server 10 may be notified of a need for persistence. The managing server 10 may be configured such that the additional program 25 of which persistence is requested cannot be deleted by maintenance or the like. In this way, the problem of absence of the additional program 25 when the additional program 25 is to be reapplied can be prevented.

While Embodiments 1 and 2 involve the managing table 236, the managing table 236 is not necessarily required. For example, a predetermined location (such as a folder) may be designated for storing the additional program 25 that is persisted, so that the additional program 25 stored in the predetermined location can be used for reapplication. In this case, the information about the need for reapplication is indicated by the presence of the additional program 25 per se stored in the predetermined location.

Although this invention has been described in detail with reference to certain embodiments, variations and modifications exist within the scope and spirit of the invention as described and defined in the following claims.

The present application is based on the Japanese Priority Applications No. 2007-299577 filed Nov. 19, 2007 and No. 2008-256852 filed Oct. 1, 2008, the entire contents of which are hereby incorporated by reference.

What is claimed is:

1. An information processing apparatus comprising:
a receiving unit configured to receive via a network a predetermined program capable of dynamically interrupting another program with a process;
an applying unit configured to apply the predetermined program to the other program without requiring modification, compiling, or linking of source code of the other program, the applying unit configured to apply the predetermined program at a position in the other program, an address of the position being determined based on mapping information stored in a storage unit, the mapping information being between each step of the source code and address information;
a reapplication necessity setting unit configured to receive a reapplication necessity setting indicating whether the predetermined program should be reapplied to the other program when, after the predetermined program is applied to the other program by the applying unit, a supply of power to at least a part of the information processing apparatus is terminated and then resumed, the reapplication necessity setting unit also being configured to record reapplication necessity information corresponding to the reapplication necessity setting in the storage unit;
a reapplying unit configured to reapply the predetermined program to the other program based on the reapplication necessity information when, after the application of the predetermined program to the other program, the supply of power to the at least a portion of the information processing apparatus is terminated and then resumed;
a persisting unit configured to store the predetermined program in a predetermined storage device, when the reapplication necessity setting indicates that the predetermined program should be reapplied to the other program, and configured to register information of the predetermined program in a managing table, the managing table including persistence flags associated with file names corresponding to a plurality of predetermined programs; and
an acquiring unit configured to acquire the predetermined program from the storage device when, after the application of the predetermined program to the other program by the applying unit, the supply of power to the at least a portion of the information processing apparatus is terminated and then resumed, wherein
the reapplying unit reapplies the predetermined program acquired by the acquiring unit to the other program, and
at least one of the receiving unit, the applying unit, the reapplication necessity setting unit, and the reapplying unit is implemented as hardware or as a hardware and software combination.

2. The information processing apparatus according to claim 1, wherein the reapplying unit reapplies the predetermined program to the other program when the information processing apparatus is turned off and then turned on.

3. The information processing apparatus according to claim 2, wherein the reapplying unit reapplies the predetermined program to the other program when the supply of power to the information processing apparatus is partially terminated due to a continuation of a no-operation status and then resumed.

4. The information processing apparatus according to claim 1, comprising a reapplication cancelling unit configured to delete the reapplication necessity information from the storage unit in response to an input of a reapplication necessity information deleting request.

5. An information processing method carried out by an information processing apparatus, the method comprising:
a receiving step of receiving via a network a predetermined program capable of dynamically interrupting another program with a process;
an applying step of applying the predetermined program to the other program without requiring modification, compiling, or linking of source code of the other program, the applying step applies the predetermined program at a position in the other program, an address of the position being determined based on mapping information stored in a storage unit, the mapping information being between each step of the source code and address information;
a reapplication necessity setting step of receiving a reapplication necessity setting indicating whether the predetermined program should be reapplied to the other program when, after the application of the predetermined program to the other program in the applying step, a supply of power to at least a portion of the information processing apparatus is terminated and then resumed, and recording reapplication necessity information corresponding to the reapplication necessity setting in the storage unit;
a reapplying step of reapplying the predetermined program to the other program based on the reapplication necessity information when, after the application of the predetermined program to the other program, the supply of power to the at least a portion of the information processing apparatus is terminated and then resumed;
a persisting step of storing the predetermined program in a predetermined storage device when the reapplication necessity setting indicates that the predetermined program should be reapplied to the other program, and registering information of the predetermined program in a managing table, the managing table including persistence flags associated with file names corresponding to a plurality of predetermined programs; and
an acquiring step of acquiring the predetermined program from the storage device when, after the application of the predetermined program to the other program in the applying step, the supply of power to the at least a portion of the information processing apparatus is terminated and then resumed,
wherein the reapplying step includes reapplying the predetermined program acquired in the acquiring step to the other program.

6. The information processing method according to claim 5, wherein the reapplying step includes reapplying the predetermined program to the other program when the information processing apparatus is turned off and then turned on.

7. The information processing method according to claim 6, wherein the reapplying step includes reapplying the predetermined program to the other program when the supply of power to the information processing apparatus is partially terminated due to a continuation of a no-operation status and then resumed.

8. The information processing method according to claim 5, comprising a reapplication cancelling step of deleting from the storage unit the reapplication necessity information in response to an input of a reapplication necessity information deleting request.

9. A non-transitory computer-readable storage medium including computer executable instructions, wherein the instructions, when executed by an information processing apparatus, cause the information processing apparatus to perform a method, the method comprising:

a receiving step of receiving via a network a predetermined program capable of dynamically interrupting another program with a process;

an applying step of applying the predetermined program to the other program without requiring modification, compiling, or linking of source code of the other program, the applying step applies the predetermined program at a position in the other program, an address of the position being determined based on mapping information stored in a storage unit, the mapping information being between each step of the source code and address information;

a reapplication necessity setting step of receiving a reapplication necessity setting indicating whether the predetermined program should be applied to the other program when, after the application of the predetermined program to the other program, a supply of power to at least a portion of the information processing apparatus is terminated and then resumed, and recording reapplication necessity information corresponding to the reapplication necessity setting in the storage unit;

a reapplying step of reapplying the predetermined program to the other program based on the reapplication necessity information when, after the application of the predetermined program to the other program, the supply of power to the at least a portion of the information processing apparatus is terminated and then resumed;

a persisting step of storing the predetermined program in a predetermined storage device when the reapplication necessity setting indicates that the predetermined program should be reapplied to the other program, and registering information of the predetermined program in a managing table, the managing table including persistence flags associated with file names corresponding to a plurality of predetermined programs; and an acquiring step of acquiring the predetermined program from the storage device when, after the application of the predetermined program to the other program in the applying step, the supply of power to the at least a portion of the information processing apparatus is terminated and then resumed, wherein the reapplying step includes reapplying the predetermined program acquired in the acquiring step to the other program.

* * * * *